United States Patent [19]

Tsukagoshi

[11] Patent Number: 5,408,269
[45] Date of Patent: Apr. 18, 1995

[54] MOVING PICTURE ENCODING APPARATUS AND METHOD

[75] Inventor: Ikuo Tsukagoshi, Tokyo, Japan

[73] Assignee: Sony Corporation, Japan

[21] Appl. No.: 66,723

[22] Filed: May 24, 1993

[30] Foreign Application Priority Data

May 29, 1992 [JP] Japan .................................. 4-163833

[51] Int. Cl.⁶ ...................... H04N 7/137; H04N 7/133
[52] U.S. Cl. ..................... 348/416; 348/402; 348/412; 348/699; 348/718
[58] Field of Search ................ 358/136; 348/402, 409, 348/412, 416, 699, 718; H04N 7/133, 7/137

[56] References Cited

U.S. PATENT DOCUMENTS

| | | | |
|---|---|---|---|
| 4,862,267 | 8/1989 | Gillard et al. | 358/136 |
| 4,937,666 | 6/1990 | Yang | 348/413 |
| 5,030,953 | 7/1991 | Chiang | 341/172 |

FOREIGN PATENT DOCUMENTS

| | | | |
|---|---|---|---|
| 0544122A1 | 1/1991 | European Pat. Off. | H04N 5/232 |
| 0447068A2 | 2/1991 | European Pat. Off. | H04N 7/13 |
| 0497586A2 | 1/1992 | European Pat. Off. | G06F 15/70 |
| 0517095A1 | 5/1992 | European Pat. Off. | H04N 5/14 |
| 57127982 | 1/1981 | Japan | G11C 8/00 |
| 2090245 | 9/1988 | Japan | G06F 12/00 |
| 2236449 | 8/1989 | United Kingdom | H04N 5/14 |

OTHER PUBLICATIONS

"Very High Efficiency VLSI Chip-Pair for Full Search Block Matching With Fractional Precision," Kun-Min Yang et al., pp. 2437-2440, CH2673-2/.80/0000-2437—1989 IEEE.

*Primary Examiner*—Howard W. Britton
*Attorney, Agent, or Firm*—Limbach & Limbach; Ian Hardcastle

[57] ABSTRACT

In a picture encoding apparatus, detection of a moving vector of half-pixel precision is executed by using a single clock without increasing the number of frame memories. Time-series input pixel data is transformed into parallel pixel data; the parallel pixel data obtained through the transformation is interpolated to thereby generate interpolating data on each pixel in an area specified by a moving vector of one-pixel precision. The interpolation data is output in parallel as pixel data on a plurality of interpolation block areas obtained by displacing by ½ pixel the block area specified by the moving vector at one-pixel unit, thereby making it possible to quickly obtain interpolation data solely on a region around the area specified by the moving vector at one-pixel unit. With this arrangement, interpolation can be executed with a substantially simplified construction as compared to the prior art, making it possible to easily detect a moving vector of half-pixel precision without increasing the number of frame memories of clock frequency.

8 Claims, 11 Drawing Sheets

NTH FRAME

FIG. 1A

N+1TH FRAME

PRIOR ART

FIG. 2A
FIG. 2B
FIG. 2C
FIG. 2D

⊚ PIXEL INDICATED BY MOVING VECTOR MVi OF ONE-PIXEL PRECISION
○ CURRENT PIXEL
□ △ × } INTERPOLATION PIXEL SHIFTED BY 1/2 PIXEL

PRIOR ART

MOVING PICTURE ENCODING APPARATUS AND METHOD

BACKGROUND OF THE INVENTION

1. Field of the Invention

This invention relates to an apparatus for compressing a digital motion picture signal, and, in particular, to an apparatus in which the efficiency of the compression is increased to reduce the quantity of data to be transmitted.

2. Description of the Related Art

Conventional techniques for compressing a digital motion picture signal obtain a moving vector before quantizing the digital motion picture signal, and quantize the motion picture signal in response to the moving vector. Compressors that compress a digital motion picture signal in response to a moving vector are disclosed in United States patents such as U.S. Pat. Nos. 4,982,285, 4,985,768, and 4,985,768.

Except when scene changes occur, a motion picture signal generally has a high correlation between portions of the motion picture signal representing two consecutive frames of the motion picture. Thus, a motion picture signal can be compressed by determining the differences in the pixel data between consecutive frames of the motion picture signal, and then quantizing these differences. However, if the picture includes moving portions, the resulting quantity of difference data can be large. For this reason, a method called block matching is used instead.

Figure 1A:
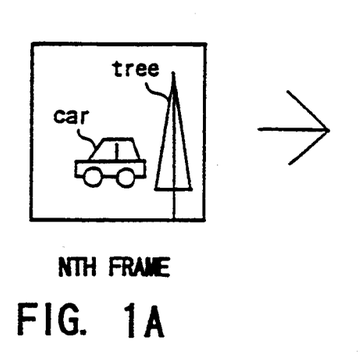
FIGS. 1A to 1C are schematic drawings illustrating block matching.
Figure 1B:
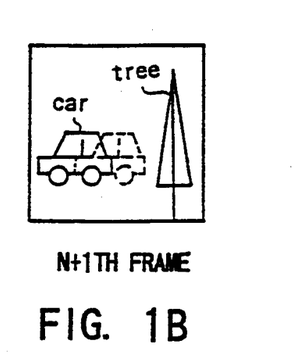
Figure 1C:
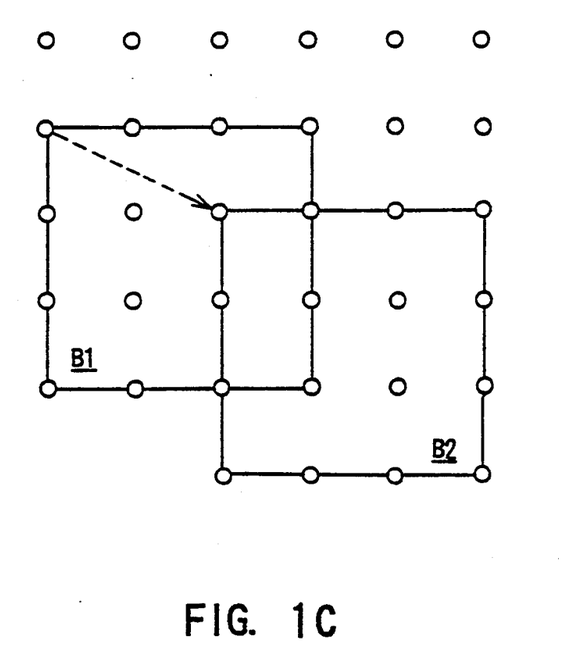
Figure 2A:
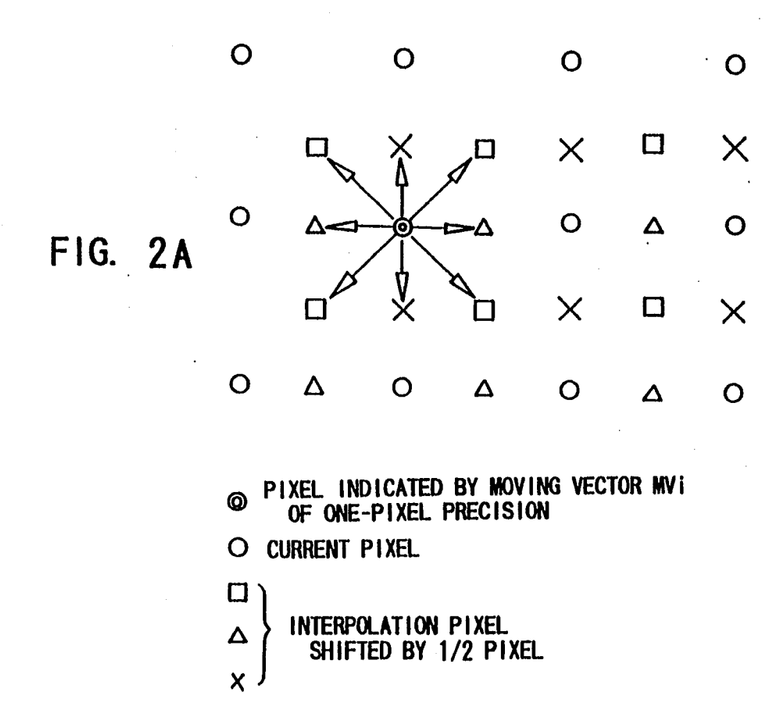
FIGS. 2A to 2D are drawings illustrating how the interpolation data are derived to calculate the moving vector with half-pixel precision.
Figure 2B:
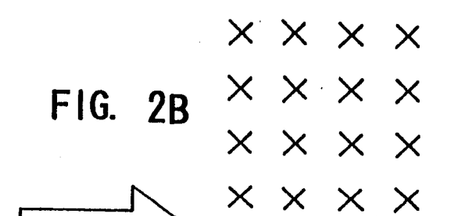
Figure 2C:
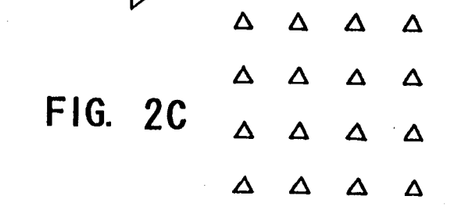
Figure 2D:
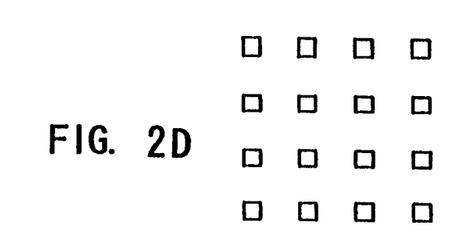

FIGS. 1A to 1C are diagrams explaining the principles of block matching. The nth frame (FIG. 1A) and the n+1th frame (FIG. 1B) are compared. In these frames, the image portion labelled "tree" is almost unchanged between the frames. Therefore, the error resulting from replacing the image portion "tree" in the n+1th frame (FIG. 1B) with the image portion "tree" of the nth frame (FIG. 1A) is rarely perceptible.

On the other hand, the image portion labelled "car" cannot be replaced in a similar manner. The image portion "car" in the n+1th frame (FIG. 1B) has moved significantly compared with the image portion "car" in the nth frame (FIG. 1A). This change of position of the image portion "car" is shown with solid lines and dotted lines in the n+1th frame of FIG. 1B.

In both the nth frame (FIG. 1A) and the n+1th frame (FIG. 1B), there is almost no change in the image portion "car" itself, and the image portion "car" can therefore be considered to be same in both frames. The block containing the image portion "car" in the nth frame (FIG. 1A) has moved horizontally to the position of the block containing the image portion "car" in the n+1th frame (FIG. 1B). Thus, the quantity of data required to represent the motion picture can then be reduced by analyzing the picture into blocks, and expressing the amount and direction of movement of each block between consecutive frames as a moving vector.

The process of finding the block of the previous frame that is in of optimum accordance with the current block of the current frame is called block matching. Block matching does not generate a moving vector immediately. Instead, as shown in FIG. 1C, matching blocks of the previous frame (B1) are compared with the current block (B2). Plural matching blocks are obtained by sequentially shifting the matching block indicated by the motion vector of the previous frame up, down, left, and right by one pixel. The difference between each pixel in the current block and the corresponding pixel of each matching block of the previous frame is determined. Then, the position of the matching block for which the sum of the differences is a minimum is determined, and the moving quantity of this matching block relative to the current block is used as the moving vector of the current block.

Such an apparatus for compressing a digital motion picture signal generates plural matching blocks by defining plural blocks of the previous frame that are displaced in the x- and y-directions relative to the matching block indicated by the moving vector of the previous frame. Block matching is performed in such a way that the moving vector of the one of the matching blocks, obtained by shifting in each direction as just described, that has the least sum of the absolute values of the differences (difference absolute value sum) between the it and the current block is determined to be the moving vector of the current block.

The quantity of difference data can be further reduced by determining the moving vector with half-pixel precision. A typical method for determining such a moving vector will be described with reference to FIG. 2. First, the moving vector is obtained for each block with one-pixel precision. Next, the moving vector Vi is determined with half-pixel precision, as indicated by □, Δ, and ×, by using the pixel (indicated by ⊙) given by the moving vector MVi as the center, and is combined with the moving vector MVi to obtain the moving vector MVH (=MVi+Vi) with half-pixel precision.

For example, in the case of a current picture block consisting of 8 (in the horizontal direction)×8 (in the vertical direction) pixels, one moving vector with one-pixel precision is obtained for each block in 64 clock cycles. In this time, the corresponding block is displaced in accordance with the moving vector (i,j) and, using the displaced location as a starting point, the data for 10 (in the horizontal direction) ×10 (in the vertical direction) pixels are read at one-pixel precision from (i−1, j−1) to (i+8, j+8), to carry out the interpolation processing.

When the moving vector MVH is determined with half-pixel precision, a double-density search area is formed by deriving interpolation points (indicated by □, Δ, and ×) between adjacent pixels (indicated by ⊙) in the search area. Then, the double-density search area is block matched with the current block to determine the moving vector MVH.

To determine the moving vector with a half-pixel precision, a method may be used in which interpolation is performed beforehand over the entire search area, and the resulting interpolation data are stored in a frame memory. In this case, 10 (in the horizontal direction)×10 (in the vertical direction) pixel data must be read in a period of 64 clock cycles to carry out half-pixel interpolation, so the interpolation operation must be carried out using a clock speed faster than the normal clock speed. Additionally, a clock signal with a clock speed of 64:100 must be generated using a PLL (Phase Locked Loop) circuit. Since the clock speed ratio of the PLL is not simple integer ratio, the system is non-synchronous, and a complex circuit must be used to provide synchronization.

In another method, the computed interpolation data are previously stored in a frame memory, and a moving vector which minimizes the difference absolute value sum can be reliably determined with half-pixel precision. However, since the number of pixels needed for interpolation is larger than the number of pixels subject to block matching, the speed of the block matching processing must be four times higher or a block matching processing circuit having four times the scale must be used.

Therefore, neither of these two alternatives is practical in terms of system construction.

SUMMARY OF THE INVENTION

In view of the foregoing, an object of this invention is to provide an apparatus for compressing a digital motion picture signal that is capable of performing the required processing using a single clock signal, and that does not require an increased number of frame memories.

The foregoing object and other objects of the invention have been achieved by the provision of an apparatus for compressing a motion picture signal to provide a compressed signal in which the motion picture signal is divided into blocks of pixels, a moving vector is obtained with one-pixel precision between a matching block of a previous picture and a current block, a moving vector with half-pixel precision is derived from the moving vector with one-pixel precision, differences between pixel data of the current block and movement compensated picture data obtained in response to the movement vector with half-pixel precision are orthogonally transformed, and resulting transform coefficients are quantized with a predetermined quantizing step size to provide the compressed signal. The apparatus comprises a parallelizing circuits that converts serial pixel data having a first word length into parallel pixel data having a second word length greater than the first word length. An interpolation data generating circuit that performs interpolation on the parallel pixel data to generate interpolation data with respect to each pixel in an area designated by the moving vector with one-pixel precision. A matching block generating circuit that provides the interpolation data output from the interpolation data generating means as interpolation data in plural matching blocks displaced by half a pixel from a matching block designated by the moving vector with one-pixel precision. A difference determining circuit that obtains, for each of the plural matching blocks from the matching block generating circuit, a difference between the interpolation data of the matching block and the pixel data of the current block. Finally, the apparatus comprises a circuit that determines the moving vector with half-pixel precision. The moving vector with half-pixel precision corresponds to the displacement quantity of the one of the matching blocks determined to have the least difference.

By detecting the moving vector with half-pixel precision using interpolation data within a region specified the moving vector MVi with one-pixel precision and the area around the region, the number of frame memories can be reduced compared with the prior art.

Further, by generating interpolation data using parallel pixel data, the processing rate of the interpolation processing can be increased, so that it is possible to detect the moving vector MVH with half-pixel precision without an increase in clock frequency.

The nature, principle and utility of the invention will become more apparent from the following detailed description when read in conjunction with the accompanying drawings in which like; parts are designated by like reference numerals or characters.

DETAILED DESCRIPTION OF THE EMBODIMENT

Preferred embodiments of this invention will be described with reference to the accompanying drawings.
(1) General Construction of the Embodiment Referring to FIG. 3, the reference numeral 1 generally indicates the apparatus according to the invention for compressing a digital motion picture signal. The pre-processing circuit 2 converts the analog motion picture signal S1 into a digital motion picture signal comprising plural pixel data. The preprocessing circuit 2 includes a matrix circuit and an analog/digital conversion circuit (not shown).

Figure 3:
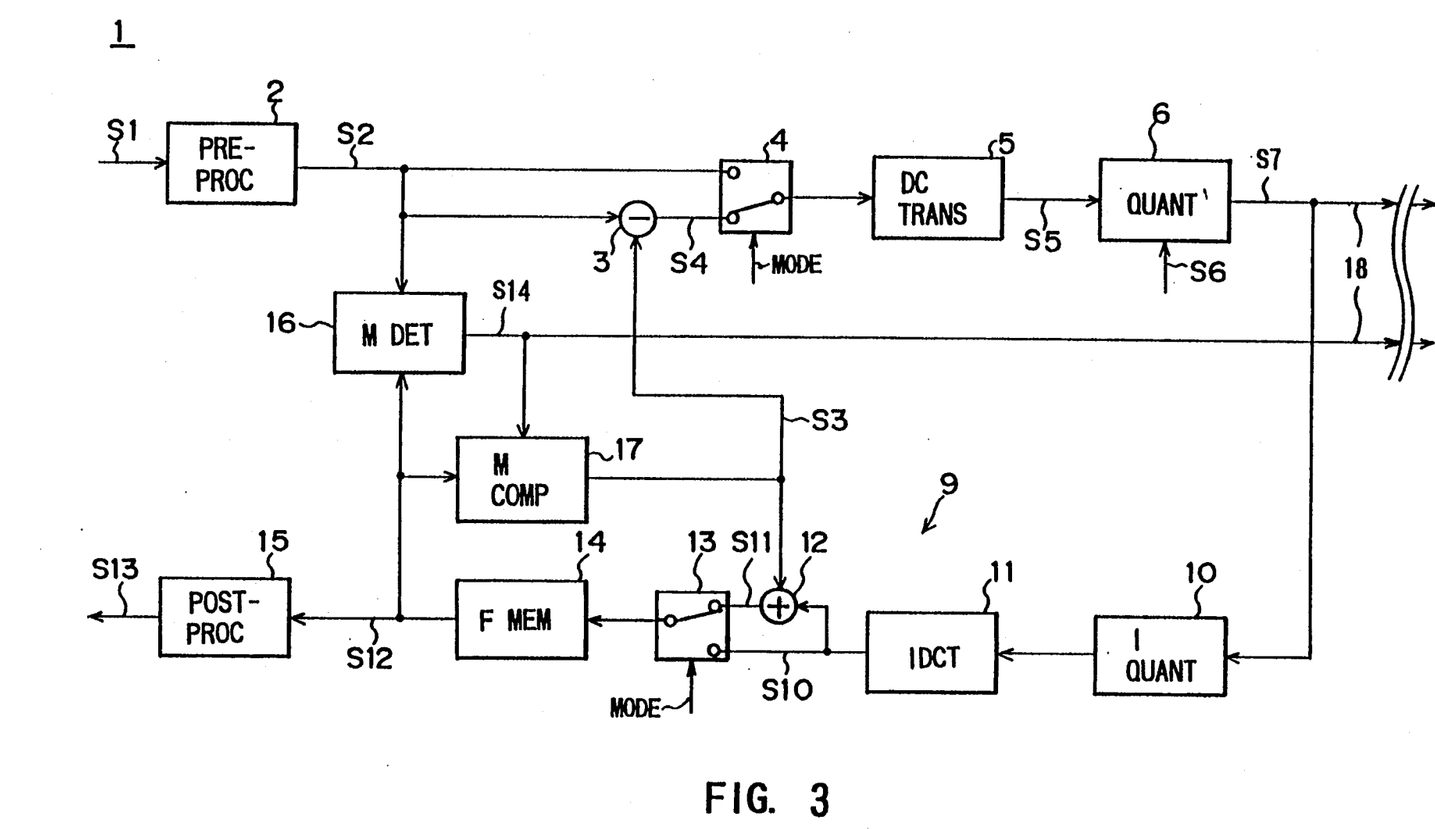
FIG. 3 is a block diagram showing: the overall construction of an apparatus for compressing a digital motion picture signal according to the present invention.

In this embodiment, the analog motion picture signal S1 is a color video signal. In the preprocessing circuit 2, the color video signal is separated into a luminance signal and a color difference signal. This invention is applied to a luminance signal processing device. This invention may additionally or alternatively be applicable to a color difference signal processing device without departing from the spirit of the invention.

Further, the pre-processing circuit 2 may be constructed to separate the luminance signal and the color difference signal from a color video signal, or to separate RGB components from it. In this case, the invention may be applied to each RGB component.

In the pre-processing circuit 2, the digital pixel data are divided into blocks of a certain number of pixel data to form a picture data block S2. Each picture data block preferably consists of 8×8 pixel data, 16×16 pixel data, and so on. Processing of one block, called the picture data block, of one frame, called the current frame, will be described. Similar processing is performed on each block in each frame.

Further, in this description, the motion picture signal is divided into frames; however, the circuit according to the invention is capable of being used when the motion picture signal is divided into fields.

The picture data block S2 from the preprocessing circuit 2 is supplied to the difference data generating circuit 3 and to the first switching circuit 4, the output of which is connected to the discrete cosine transform circuit 5.

The difference data generating circuit 3 determines the difference between the picture data block S2 and the movement compensation data S3, thereby obtaining the inter-frame difference between the movement compensated data block obtained by performing movement compensation on the previous frame, and the picture data block of the current frame. The resulting difference data block S4 is supplied to the first switching circuit 4.

The first switching circuit 4 is controlled to switch according to the compression mode, and delivers either the picture data block S2 or the difference data block S4, whichever has the least difference absolute value sum relative to the average level of the block, to the discrete cosine transform circuit 5.

In this connection, when compression can be effected with less data using intra-frame compression, this will be referred to as the intra-frame compression mode, and when compression can be effected with less data using with inter-frame compression, this will be referred to as the inter-frame compression mode.

The discrete cosine transform circuit 5 performs an orthogonal transform on each picture data block S2, or on each difference data block S4, depending on the state of the first switching circuit 4, using a discrete cosine transform. The resulting block of transform coefficients S5 is supplied to the quantizing circuit 6.

A discrete cosine transform is used in this embodiment; however, other orthogonal transforms, for example, a fast Fourier transform (FFT) can also be used, as can a Wavelet transform or a Haar transform.

The quantizing circuit 6 quantizes the block of transform coefficients S5 using a quantizing step size set by the step-size control signal S6, and supplies the resulting block of quantized coefficients S7 via the digital output path 18 to processing circuits (not shown), which include a variable-length coding circuit and so on.

The apparatus for compressing a digital motion picture signal additionally includes the local decoder 9 for restoring the compressed signal to provide pictures for use as reference pictures. The local decoder locally decodes each block of quantized coefficients S7 using the dequantizing circuit 10 and the inverse discrete cosine transform circuit 11. The resulting locally-decoded data block S10 is fed to the synthesized data generating circuit 12 and to the second switching circuit 13.

When the picture data block is compressed in the inter-frame compression mode, the second switching circuit 13 supplies to the previous frame memory 14 a recovered picture data block S11 recovered by synthesizing the movement compensation data S3 with the locally-decoded data block S10. On the other hand, when the picture data block is compressed in the intra-frame compression mode, the second switching circuit 13 supplies the locally-decoded data block S10 directly to the previous frame memory 14.

The previous frame memory 14 replaces each block of a previous frame stored therein with the locally-expanded data block S10 or the recovered picture data block S11 to regenerate the picture of the previous frame. The previous frame memory also supplies the picture data of the block of the previous frame corresponding to the picture data block S2 to the post processing circuit 15 as the search window S12.

The post processing circuit 15 converts the search window S12 for each block into a raster signal, i.e., into a line sequence signal. Also, the raster signal is converted into an analog signal by an internal digital-to-analog converter circuit (not shown), and is fed as the expanded video signal S13 to an output terminal (not shown).

The movement detecting section 16 compares the picture data block S2 with the search window S12, i.e., part of the previous picture supplied from the frame memory 14, to obtain the moving vector MVH with half-pixel precision between the picture data block S2 and a matching block of the previous frame. The moving vector signal S14 is fed to the movement compensating circuit 17 and also to the digital output path 18.

The data fed to the digital output path 18 are processed by an error correcting circuit and a modulator and so on (not shown) to produce a signal for transmission or for recording on a suitable recording medium, such as an optical disc.

The movement compensation circuit 17 selects the portion of the previous picture that is shifted relative to the picture data block S2 by the magnitude and direction of movement defined by the moving vector signal S14, and supplies the resulting movement compensation data S3 to the difference data generating circuit 3 and to the synthesized data generating circuit 12.

(2) Construction of the Movement Detecting Section 16

Figure 4:
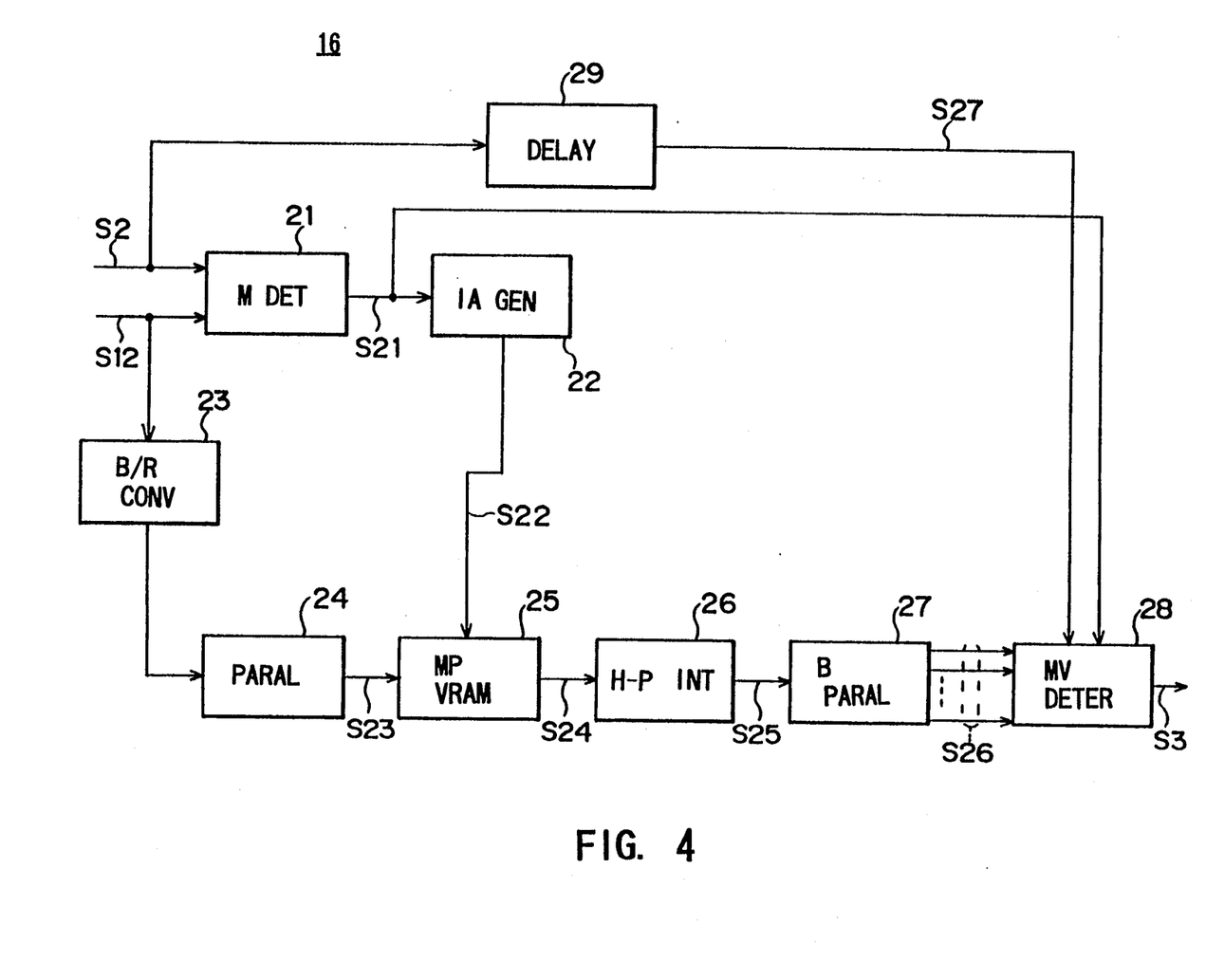
FIG. 4 is a block diagram showing the construction of the movement detecting circuit section.

The movement detecting section 16 first determines the moving vector MVi with one-pixel precision, and then generates interpolation pixels from the original pixels of the previous frame only in the region surrounding the block specified by the moving vector. Then,, the movement detecting section 16 matches the picture data block S2 to matching blocks of the interpolation pixels. The matching block indicated by the moving vector with one-pixel precision is used as the center, and a block matching process is performed with half-pixel precision using matching blocks displaced from the center by $-\frac{1}{2}$, 0 and $+\frac{1}{2}$ pixel in the x- and y-directions. The amount of displacement of the best matching block, i.e., the matching block having the minimum difference absolute value sum, is adopted as the moving vector Vi with half-pixel precision. The moving vector Vi is combined with the previously-determined moving vector MVi with one-pixel precision to generate the moving vector MVH with half-pixel precision.

The practical construction of the movement detecting section 16 will be described with reference to FIG. 4. The movement detecting circuit 21 derives the moving vector MVi with one-pixel precision from the picture data block S2 and the search window S12 of the previous frame, and supplies the moving vector MVi with one-pixel precision to the interpolation address generating circuit 22 as moving vector data S21.

The interpolation address generating circuit 22 consists of a read-only memory, and converts the pixel positions indicated by the moving vector MVi into corresponding address data, which it provides as interpolation address data S22.

The movement detecting section 16 converts the search window S12, which it receives in blocks, into raster data by means of the block/raster converting circuit 23. The resulting raster data are fed into the parallelizing circuit 24, where they are parallelized, as will be described in more detail below. The resulting parallel pixel data S23 are fed serially from the parallelizing circuit 24, and are successively written into the multi-port VRAM (Video Random Access Memory) 25.

In response to the interpolation address S22 received from the interpolation address generating circuit 22, the multi-port VRAM 25 delivers the parallel pixel dam of the search area in which interpolation is to be performed. The resulting parallel pixel data S24 are fed to the half-pixel interpolating circuit 26.

The half-pixel interpolating circuit 26 receives the parallel pixel data S24, from which it generates interpolation data S25. The block serializing circuit 27 receives the interpolation data S25 and generates 9 matching blocks of serial interpolation data S26. The 9 matching blocks include the data for the matching block indicated by the moving vector MVi with one-pixel precision. Although the data for the matching block indicated by the moving vector MVi with one-pixel precision are not, strictly speaking, interpolation data, since they are not generated by interpolation, they will nevertheless be called interpolation data for the sake of brevity. The matching blocks of interpolation data S26 are fed into the moving vector determining circuit 28.

The moving vector determining circuit 28 determines a difference absolute value sum between the delayed picture data block S27, which is the picture data block S2 fed through the delay circuit 29, and each of the 9 matching blocks of interpolation data S26. The moving vector determining circuit also determines the best matching block by determining which of the 9 matching blocks of interpolation data S26 has the least difference absolute value sum, and establishes the displacement of the best matching block as the moving vector Vi with half-pixel precision.

Finally, the moving vector determining circuit 28 provides the moving vector MVH by synthesizing the moving vector Vi with half-pixel precision with the moving vector MVi received from the movement detecting circuit 21.

(2-1) Construction of the Parallelizing Circuit 24 and the Multi-port RAM 25

The parallelizing circuit 24 will next be described in detail with reference to FIG. 5, which shows a practical example of the construction of the parallelizing circuit 24. In this example, the parallelizing circuit 24 is composed of two FIFO (First In First Out) memories 31 and 32, into which the 8-bit pixel data, serially received from the block/raster converting circuit 23, are alternately written. Pairs of pixel data are then simultaneously read out from both FIFO memories onto a 16-bit data path. This parallelizes the pixel data serially received from the block/raster converting circuit 23 by arranging the pixel data into 16-bit pairs of two pixel data each. The resulting 16-bit parallel pixel data are serially read out as parallel pixel data S23.

The 8-bit pixel data, e.g., the pixel data numbers 0, 1, 2, 3, 4, 5, . . . , serially received from the block/raster converting circuit 23, are first alternately written into each of the FIFO memories 31 and 32. Thus pixel data numbers, e.g., 0, 2, 4, . . . , are written into FIFO memory 31, and pixel data numbers, e.g., 1, 3, 5, . . . , are written into FIFO memory 32. The pixel data are serially read out of the FIFO memories into a 16-bit data path in pairs consisting of, e.g, pixel data numbers 0 and 1; pixel data numbers 2 and 3; pixel data numbers 4 and 5; . . . as parallel pixel data S23.

The addressing provided in the multi-port VRAM 25 is such that one address defines the location of each of the parallel pixel data received from the parallelizing circuit 24 via the delay circuit 33. This reduces the address space to one half, since one address in the VRAM 25 defines the location of two pixel data. The plane in which one address refers to two pixel data will henceforth be referred to as the "compressed plane".

In the compressed plane, the 8 most significant bits and the 8 least significant bit of the 16-bit parallel pixel data will be called the high-order bit sequence and the low-order bit sequence, respectively. Therefore, it is possible to divide the parallel pixel data complimentarily into a high-order bit sequence representing, for example, even-numbered pixels, and a low order bit sequence representing, for example, odd-numbered pixels.

(2-2) Construction of the Half-Pixel Interpolating Circuit 26 and the Block Serializing Circuit 27

Figure 6:
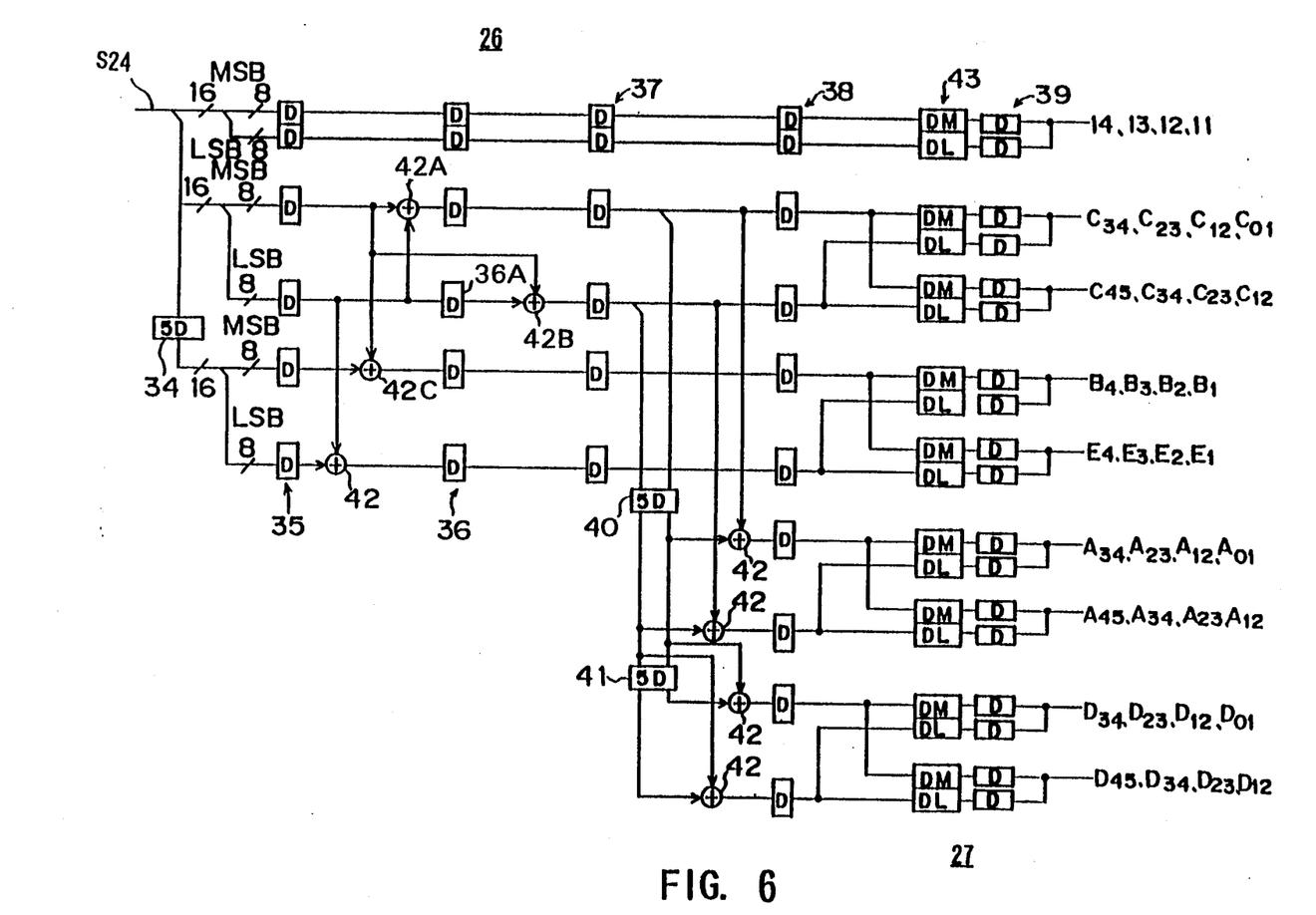
FIG. 6 is a block diagram showing an embodiment of the half-pixel interpolating circuit and the block serializing circuit.

The half-pixel interpolating circuit 26 and the block serializing circuit 27 are constructed as shown in FIG. 6. The half-pixel interpolating circuit 26 performs data interpolation in a parallelized state, and the block serializing circuit 27 serializes the resulting interpolation data, making it possible to obtain the absolute value difference sum of each block in the time period corresponding to one block.

In FIG. 6, the half-pixel interpolating circuit 26 receives the 16-bit parallel pixel data S24 from the multi-port VRAM 25, branches the 16-bit parallel pixel data into two parallel paths, and into a third parallel path delayed by the five unit delay circuit 34 by a delay time corresponding to 5 clock cycles. A delay of 5 clock cycles corresponds to a delay of one line in the picture data block. Each of the three parallel paths is further branched into a high-order bit sequence and a low-order bit sequence to form a total of six parallel sequences of 8-bit pixel data. It should be noted that the pixel data on the parallel paths marked MSB are the pixel data of, for example, even-numbered pixels, and the pixel data on the parallel paths marked LSB are the pixel data of, for example, odd-numbered pixels.

Interpolation is carried out by adding selected pairs of pixel data and dividing the result by two. Half of the interpolations in the x-direction are carried out by summing the pixel data in adjacent parallel paths derived from the same parallel pixel data. This carries out interpolation between the high-order bit sequence and the low-order bit sequence of each of the parallel pixel data, and produces alternate ones of the required interpolation data in the x-direction. Such interpolation is carried out, for example, by the adder 42A.

The remainder of the interpolations in the x-direction are carried out by summing the low-order bit sequence of one parallel pixel value and the high-order bit sequence of the next parallel pixel value. Such interpolation is carried out summing the pixel data in adjacent parallel paths derived from the same parallel pixel. However, the low-order bit sequence is taken from a point in the parallel path that is delayed by 1 clock cycle relative to the point in the parallel path from which the high-order bit sequence is taken. The one-pixel delays marked D, such as the one-pixel delay 35, delay the pixel values in the parallel paths by one clock cycle, a time corresponding to one pixel element. Thus, interpolation carried out by summing the low-order bit sequence of one of the parallel pixel data and the high-order bit sequence of the next one of the parallel pixel data is carried out, for example, by the delay 36A and the adder 42B Interpolation in the y-direction is carried out by summing pixel values in parallel paths that are delayed relative to one another by five clock cycles, a time corresponding to one line of the picture data block. This delay is provided by five clock-cycle delays marked 5D, such as the five clock cycle delays 34, 40, and 41, which delay the pixel values in the parallel paths by a time corresponding to five pixel elements, or one line. For example, the delay 34 and the adder 42C carry out interpolation in the y-direction.

Interpolation in the x- and y-directions are provided by combining the techniques just described.

The resulting interpolation data are selectively delayed by the one clock cycle delays 36, 37, and 38, prior to feeding into the block parallelizing circuit 27.

Figure 5:
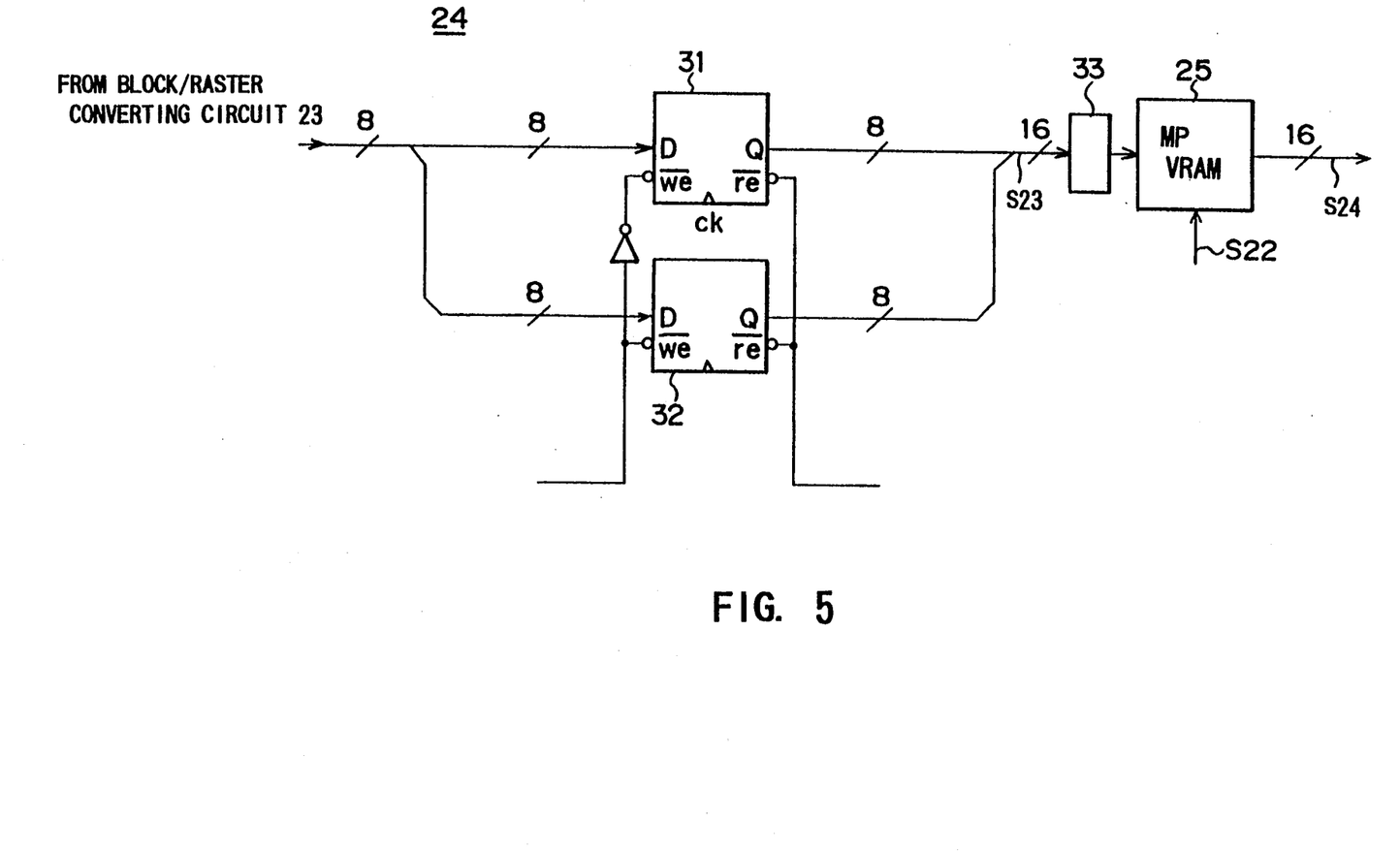
FIG. 5 is a block diagram showing an embodiment of the parallelizing circuit of the present embodiment.

The block serializing circuit 27 consists of nine FIFO memory pairs 43, similar to the FIFO memory pair 31 and 32 shown in FIG. 5, and serializes the 8-bit interpolation data from a total of 18 parallel paths to provide a total of nine matching blocks on independent parallel channels. In FIG. 6, each of the nine parallel channels is marked to identify some of the interpolation data included in the matching block provided by that channel. The markings correspond to the pixel locations shown in FIGS. 7 through 11.

Figure 7:
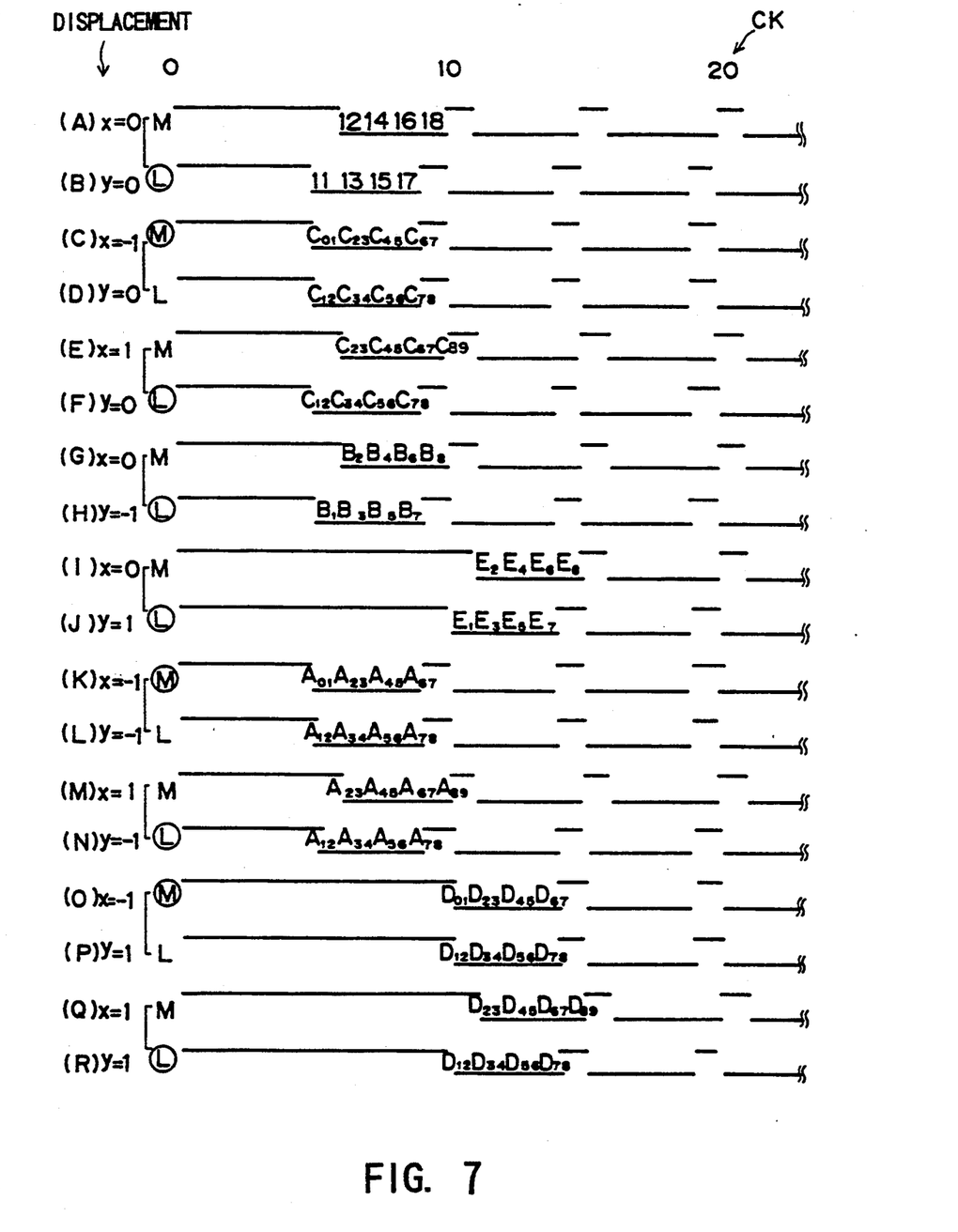
FIG. 7 is one half of a timing chart showing how the interpolation data are written and read by means of write arid read signals supplied to a FIFO memory.
Figure 8:
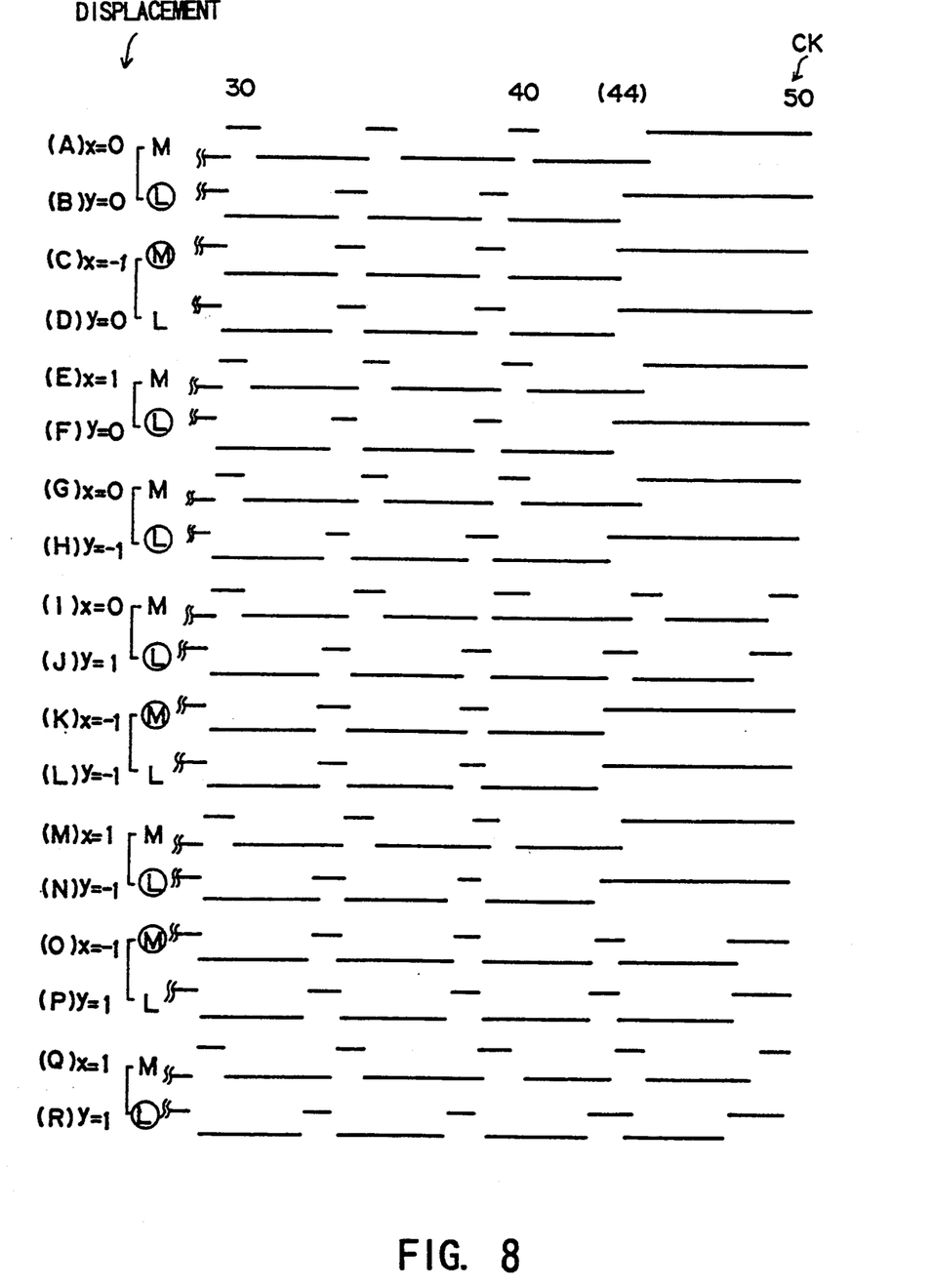
FIG. 8 is the other half of a timing chart showing how the interpolation data are written and read by means of write and read signals supplied to the FIFO memory.

FIGS. 7 and 8 illustrate the way in which the interpolation data are written into and are read out of the FIFO memories 43. The detailed operation will be described later. Data are written into the FIFO memories 43 writes in response to a writing pulse (-we), and the written data are read out in response to a reading pulse (-re).

(2-3) Construction of the Moving Vector Determining Circuit 28

Figure 9:
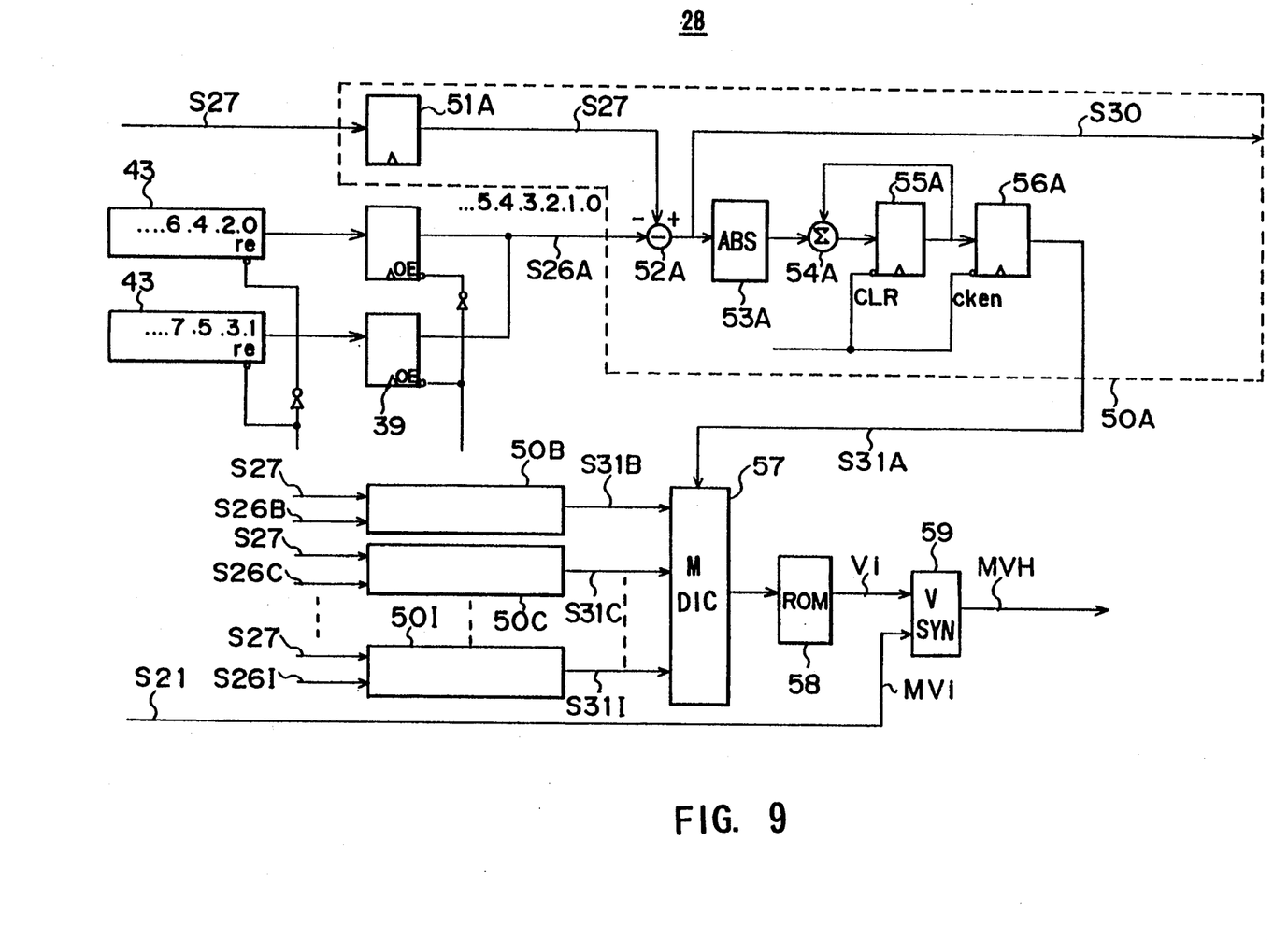
FIG. 9 is a block diagram illustrating the moving vector determining circuit.

FIG. 9 shows the construction of the moving vector determining circuit 28. The moving vector determining circuit 28 includes nine difference absolute value sum calculating circuits 50 (50A, 50B, . . . , 50I) each of which calculates a difference absolute value sum for one of the 9 matching blocks of interpolation data S26A through S26I. The operation of the absolute value sum calculating circuits will be now described using the difference absolute sum calculating circuit 50A as an example.

In the difference absolute value sum calculating circuit 50A, the subtracting circuit 52A determines the pixel-by-pixel difference between the matching block of interpolation data S26A and the delayed picture data block S27, i.e., the picture data block S2 delayed by the delay circuit 29, and further delayed by the delay circuit 51A. The resulting differences are fed as the residual data block S30A into the absolute value circuit 53A, which determines the absolute value of the residual data block S30A. The absolute values of the residual data block are fed to the summer 54A and the delay circuit 55A, where they are summed, and the resulting sum is fed through the delay circuit 56A to the minimum value determining circuit 57 as the difference absolute value sum S31A.

The difference absolute value sums S31A to S31I are respectively the difference absolute value sum (S31A) for the matching block indicated by the moving vector with one-pixel precision and the difference absolute value sums (31B-31I) for the matching blocks displaced by $+\frac{1}{2}$, 0, and $+\frac{1}{2}$ pixel in the x- and y-directions relative to the indicated matching block.

The read-only memory 57 is fed with the matching block that has the least difference absolute value sum from the minimum value determining circuit 57, and, in response thereto, provides the corresponding moving vector with half-pixel precision Vi.

Finally, the vector synthesizing circuit 59 combines the moving vector Vi with the moving vector MVi with one-pixel precision given by the movement detecting circuit 21 to generate the moving vector MVH with half-pixel precision.

(3) Operation and Effects of the Embodiment

The operation of the above-described construction of the digital motion picture signal compressor according to the invention will now be described in detail.

In FIG. 3, the picture data block S2 from the pre-processing circuit 2 of the digital motion picture signal compressor, and the search window S12 from the frame memory 14, are fed into the movement detecting section 16.

In the movement detecting section 16 shown in FIG. 4, the picture data block S2 and the search window S12 are provided to the movement detecting circuit 21, which provides the moving vector MVi with one-pixel precision.

The search window S12 is also provided to the block-/raster convening circuit 23, the output of which is fed to the parallelizing circuit 24. The resulting 16-bit parallel pixel data S24 are fed from the parallelizing circuit into the multi-port VRAM 25, so that a moving vector with half-pixel precision, centered around the moving vector MVi with one-pixel precision, can be generated with emphasis on the surrounding area.

The addressing in the multi-port VRAM 25 is such that one address corresponds to the data for 2 pixels received from the parallelizing circuit 24 through the delay circuit 33. This allows the address space to be halved. The plane indicated by the half address space will be referred to as "the compressed plane".

Reading of the pixel data will be described with reference to FIG. 10, which depicts the compressed plane, and to FIG. 11, which depicts the picture plane.

In both planes, a mark ○ indicates an original pixel, marks Δ and × indicate half pixels, and a mark ⊙ indicates the pixel in the upper-left corner of the matching block indicated by the moving vector with one-pixel precision. In the Figures, the reference numeral 11 indicates the mark ⊙.

Figure 10:
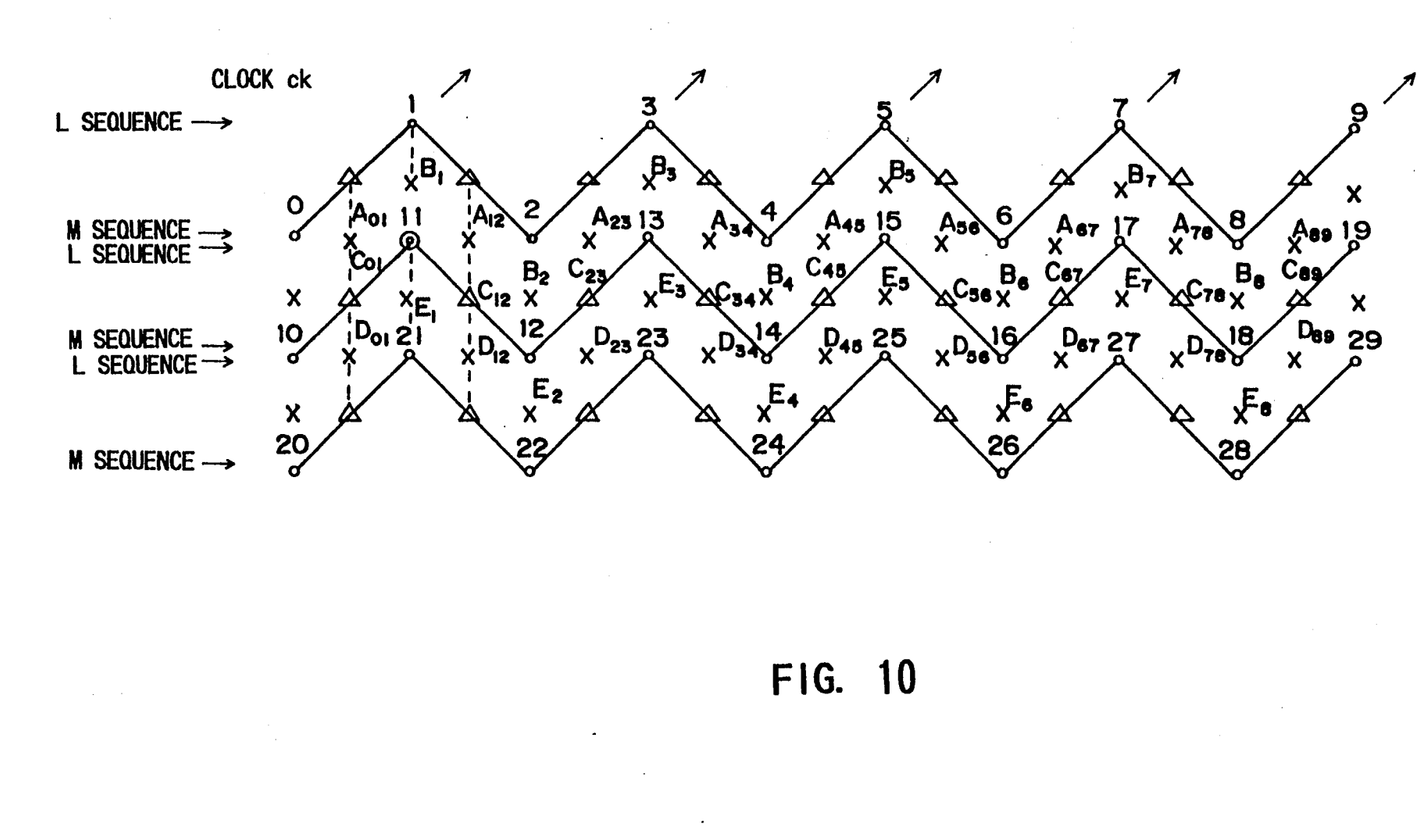
FIG. 10 is a chart showing the relationship between the interpolation pixels and original pixels in the compressed plane.

In the compressed plane shown in FIG. 10, the half pixel formed by interpolation from the original pixels at address "0" and address "1" is shown with the mark Δ on the line joining addresses 0 and 1. Similarly, the half pixel formed by interpolation from the original pixels at address "1" and address "2" is shown with the mark Δ on the line connecting addresses 1 and 2, and so on. The half pixels indicated by the mark × are formed by interpolation in the y-direction between the original pixels marked ○ above and below, or between the half-pixels marked A, above and below, as shown by dotted lines. In the picture plane shown in FIG. 11, there is a similar relation between the original pixels and the half pixels generated by interpolation.

In FIG. 6, to generate the interpolation pixels, the half-pixel interpolating circuit 26 receives the parallel pixel data successively read from the multi-port VRAM 25, starting from the parallel pixel data of the pixel corresponding to the relative address number 0. As shown in FIG. 10, the half-pixel interpolating circuit 26 carries out interpolation in the x-direction between the high-order-bit sequence (MSB) and the low-order bit sequence (LSB) of the parallel pixel data at the present address, and between the low-order bit sequence of the parallel pixel data at the present address and the high-order bit sequence of the parallel pixel data at the .next address.

In the y-direction, the half-pixel interpolating circuit 26 effects interpolation alternately between high-order bit sequences delayed by a delay corresponding to one line of the block in the x-direction of the compressed plane, and between low-order bit sequences delayed by a delay corresponding to one line of the block in the x-direction of the compressed plane.

By performing processing in the compressed plane, the half-pixel interpolating circuit 26 generates interpolation data with half-pixel precision in the picture plane, making it possible for the interpolation of 10×3 pixels to be calculated in 5×3 clock cycles, i.e., in half the number of clock cycles.

The half-pixel interpolating circuit 26 provides the resulting interpolation data on 18 parallel paths, which are fed to the block serializing circuit 27. In addition to serializing the interpolation data, the block serializing circuit uses the FIFO memories 43 to effect phase difference control between the interpolation data prior to the block serializing operation. By providing appropriately-timed writing pulses to each of the FIFO memories 43, the block serializing circuit 27 writes into each pair of FIFO memories 43 only the interpolation data required for the matching block provided by the memory pair. Then, after a fixed time, the block serializing circuit begins reading the interpolation data written into the FIFO memories 43. A read pulse is alternately fed to the high-order bit and low-order bit portions of each FIFO memory pair 43, as described above with reference to FIGS. 5 and 6.

Figure 11:
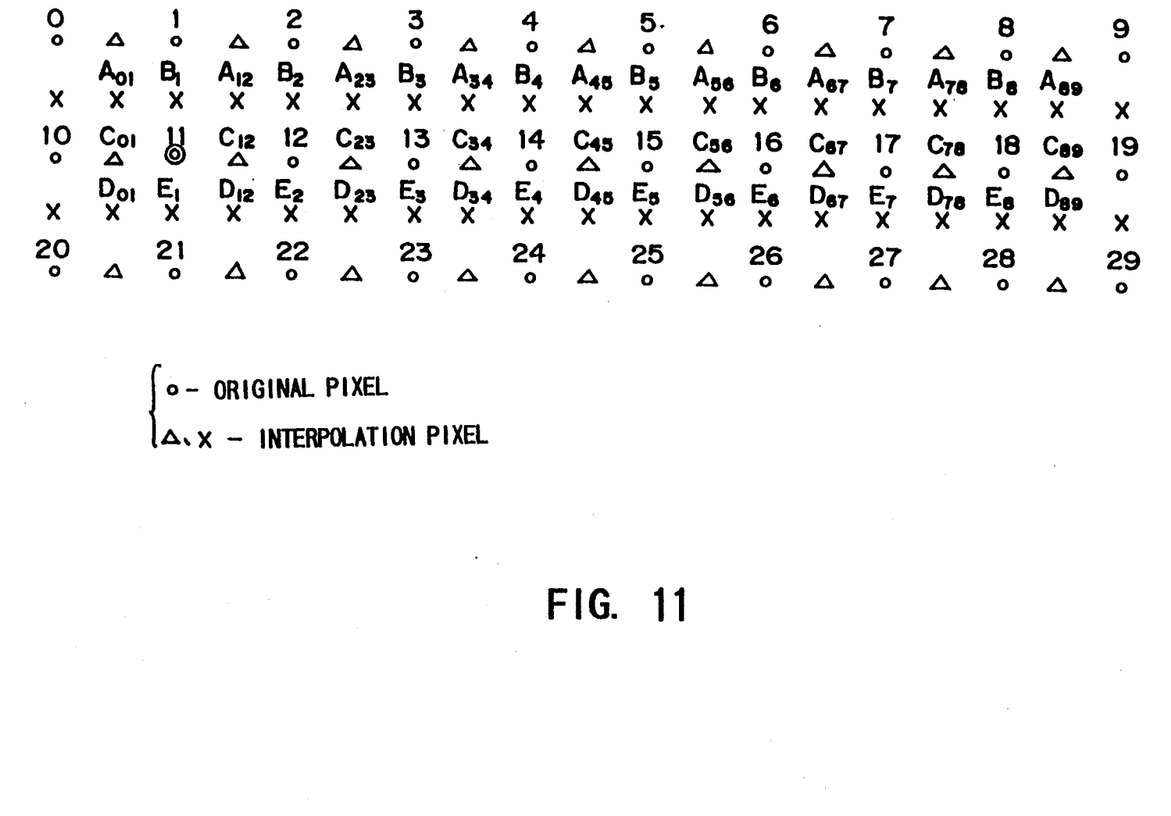
FIG. 11 is a chart showing the relationship between the interpolation pixels and original pixels in the picture plane.

The interpolation data locations shown in FIGS. 7 and 8 correspond to the interpolation data locations indicated in FIGS. 10 and 11. The interpolation data are written into the FIFO memory 43 when the write pulse (-we) is at a low level (that is, in the logical "L" state), and the written data is read out by starting the read pulse (-re) after a fixed period of time. The read pulse (-re) fed to the FIFO memory pairs is of a clock-alternate type, enabling the 8-bit pixel data represented by the high-order bit sequence and the low-order bit sequence to be read alternately from the FIFO memories constituting each FIFO memory pair.

For this purpose, reading must be started at the point in the sequence indicated by ○ in FIGS. 7 and 8. Of the 9 matching blocks of interpolation data shown, the earliest end of writing into the FIFO memory 43 at the 44th clock cycle from the block pulse (which appears once every 64 clock cycles). With clock-alternate reading, a time corresponding to the full 64 clock cycles is necessary, so that reading the interpolation data must be started at the latest at a point 20 clock cycles (64−44) earlier than the end of the current block. If the above conditions are satisfied, writing the next block will not start before reading the written data of the current block has been completed.

In FIG. 6, the nine matching blocks of interpolation data provided by the block serializing circuit 27 are, in order from the top:

(1) interpolation data for the block indicated by the moving vector MVi with one-pixel precision, that is, 11, 12, 13 and 14 (as mentioned above, that these data are not, strictly speaking, interpolation data, since they are not generated by interpolation. However, for the sake of brevity, they will nevertheless be called interpolation data);
(2) interpolation data for the block displaced by half a pixel in the −x-direction with respect to the block indicated by the moving vector MVi, that is, C01, C12, C23 and C34;
(3) interpolation data for the block displaced by half a pixel in the +x-direction with respect to the block indicated by the moving vector MVi, that is, C12, C23, C34 and C45;
(4) interpolation data for the block displaced by half a pixel in the −y-direction with respect to the block indicated by the moving vector MVi, that is, B1, B2, B3 and B4;
(5) block pixel data displaced by half a pixel in the in the +y-direction with respect to the block indicated by the moving vector MVi, that is, E1, E2, E3 and E4;
(6) interpolation data for the block displaced by half a pixel in both the −x-and −y-directions with respect to the block indicated by the moving vector MVi, that is, A01, A12, A23 and A34;
(7) interpolation data for the block displaced by half a pixel in the +x-direction and the −y-direction with respect to the block indicated by the moving vector MVi, that is, A12, A23, A34 and A45;
(8) interpolation data for the block displaced by half a pixel in the −x-direction and the +y-direction with respect to the block indicated by the moving vector MVi, that is, D01, D12, D23 and D34; and
(9) interpolation data for the block displaced by half a pixel in both the +x- and +y-directions with respect to the block indicated by the moving vector MVi, that is, D12, D23, D34 and D45.

The moving vector detecting circuit 28 determines the difference absolute value sums between each matching block of interpolation data S26A through S27I and the delayed picture data block S27, providing the minimum value thereof as residual block data S30 with half-pixel precision.

Finally, the moving vector Vi for that block is combined with the moving vector MVi of one-pixel precision to form the moving vector MVH at half-pixel precision, and the picture of the current block is successively compressed.

With the above construction, the pixel data in the search window S12 are parallelized by the parallelizing circuit 24, and then the half-pixel interpolating circuit 26 derives interpolation data with half-pixel precision in the area around the moving vector with one-pixel precision. Then, by rearranging the interpolation data in the block serializing circuit 27, nine matching blocks of interpolation data displaced by $+\frac{1}{2}$, 0, and $-\frac{1}{2}$ a pixel in the x- and y-directions relative to the matching block indicated by the moving vector with one-pixel precision are supplied to the moving vector determining circuit 28. This makes it possible to easily obtain the moving vector with half-pixel precision using a single clock without ncreasing the number of frame memories.

Further, by adopting a moving vector with half-pixel precision and reducing the amount of inter-frame difference information, the amount of information generated when the motion picture signal is compressed is reduced, thereby achieving an improvement in terms of picture quality.

Further, even when an expensive dedicated LSI is used for determining the moving vector detection, the number of parts can be reduced, thereby realizing a reduction in system costs.

(4) Other Embodiments

While the above embodiment has been described with reference to a parallelizing circuit 24 constructed as shown in FIG. 5, the present invention is not limited to this. It is also possible to parallelize plural pixel data with different circuit configurations.

Also, while the above embodiment has been described with reference to the half-pixel interpolating circuit 26 constructed as shown in FIG. 6, the present invention is not limited to this. It is also possible to interpolate parallelized data with different circuit configurations.

Further, while the above embodiment has been described with reference to a block serializing circuit 27 constructed as shown in FIG. 9, the present invention is not limited to this. It is also possible to block-serialize the interpolation data with different circuit configurations and signal timing.

Still further, while the above embodiment has been described with reference to movement compensation being effected on only the object range, the present invention is not limited to this. It is also widely applicable to other interpolating circuits intended for data interpolation.

As described above, in accordance with the present invention, time-sequential pixel data is successively transformed into parallel pixel data and the parallel pixel data with a compressed address space are then interpolated to generate interpolation data for each half pixel in an area designated by the moving vector with one-pixel precision. These interpolation data are fed out in parallel matching blocks, one for each of the plural matching blocks obtained by displacing the block indicated by the moving vector with one-pixel precision by half a pixel in the plus and minus x- and y-directions. This way, it is possible to determine the moving vector with half-pixel precision by interpolation solely in the region surrounding the matching block specified by the moving vector with one-pixel precision.

This makes it possible to execute interpolation processing at high speed with a substantially simplified construction compared to the prior art. This enables a moving vector with half-pixel precision to be easily determined without increasing the number of frame memories or raising the clock frequency.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. Apparatus for compressing a motion picture signal to provide a compressed signal, wherein the motion picture signal is divided into blocks of pixels, a moving vector is obtained with one-pixel precision between a matching block of a previous picture and a current block, a moving vector with half-pixel precision is derived from the moving vector with one-pixel precision, differences between pixel data of the current block and movement compensated picture data obtained in response to the movement vector with half-pixel precision are orthogonally transformed, and resulting transform coefficients are quantized with a predetermined quantizing step size to provide the compressed signal, the apparatus comprising:

parallelizing means for converting serial pixel data having a first word length into parallel pixel data having a second word length greater than the first word length;

interpolation data generating means for performing interpolation on the parallel pixel data to generate interpolation data with respect to each pixel in an area designated by the moving vector with one-pixel precision;

matching block generating means for providing the interpolation data output from the interpolation data generating means as interpolation data in plural matching blocks displaced by half a pixel from a matching block designated by the moving vector with one-pixel precision;

difference determining means for obtaining, for each of the plural matching blocks from the matching block generating means, a difference between the interpolation data of the matching block and the pixel data of the current block; and means for determining the moving vector with half-pixel precision, the moving vector with half-pixel precision corresponding to a displacement quantity of the one of the matching blocks determined to have the least difference.

2. The apparatus of claim 1, wherein:
each of the parallel pixel data includes most significant bits and least significant bits; and
the interpolation data generating means includes means for generating horizontal interpolation data by alternately repeating:
interpolation between the most significant bits and the least significant bits of each of the parallel pixel data, and
interpolation between the most significant bits of each of the parallel pixel data and the least significant bits of each of the parallel pixel data at one address previous.

3. The apparatus of claim 1, wherein the parallelizing means converts pairs of serially input pixel data into the parallel pixel data, compressing by half an address space designating the pixel data in each block.

4. The apparatus of claim 3, wherein the parallelizing means comprises two first-in, first-out memories.

5. The apparatus of claim 1, wherein:
each of the parallel pixel data includes most significant bits and least significant bits; and
the interpolation data generating means includes means for generating vertical interpolation data by repeating interpolation between the most significant bits of the parallel pixel data delayed by one line of the block, and between the least significant bits of the parallel pixel data delayed by one line of the block.

6. The apparatus of claim 5, wherein the interpolation data generating means includes:
means for branching the parallel pixel data into three parallel paths,
means for separating the parallel pixel data in each parallel path into most significant bits and least significant bits to provide six parallel paths of pixel data, and
means for selectively delaying the pixel data in the parallel paths to provide selectively-delayed pixel data, and for adding selected ones of the selectively-delayed parallel pixel data to generate the interpolation data.

7. The apparatus of claim 1, wherein the matching block generating means includes memory means for storing the interpolation data in response to a write signal, the write signal being applied to select the interpolation data to be stored.

8. The apparatus of claim 7, wherein the matching block generating means:
receives the interpolation data on eighteen parallel paths, and provides nine parallel matching blocks of serial interpolation data; and
includes plural first-in, first out memories and plural delay circuits.

* * * * *